L. E. TRIMM.
AUTOMOBILE WHEEL LOCKING DEVICE.
APPLICATION FILED SEPT. 18, 1919.
1,379,423.
Patented May 24, 1921.
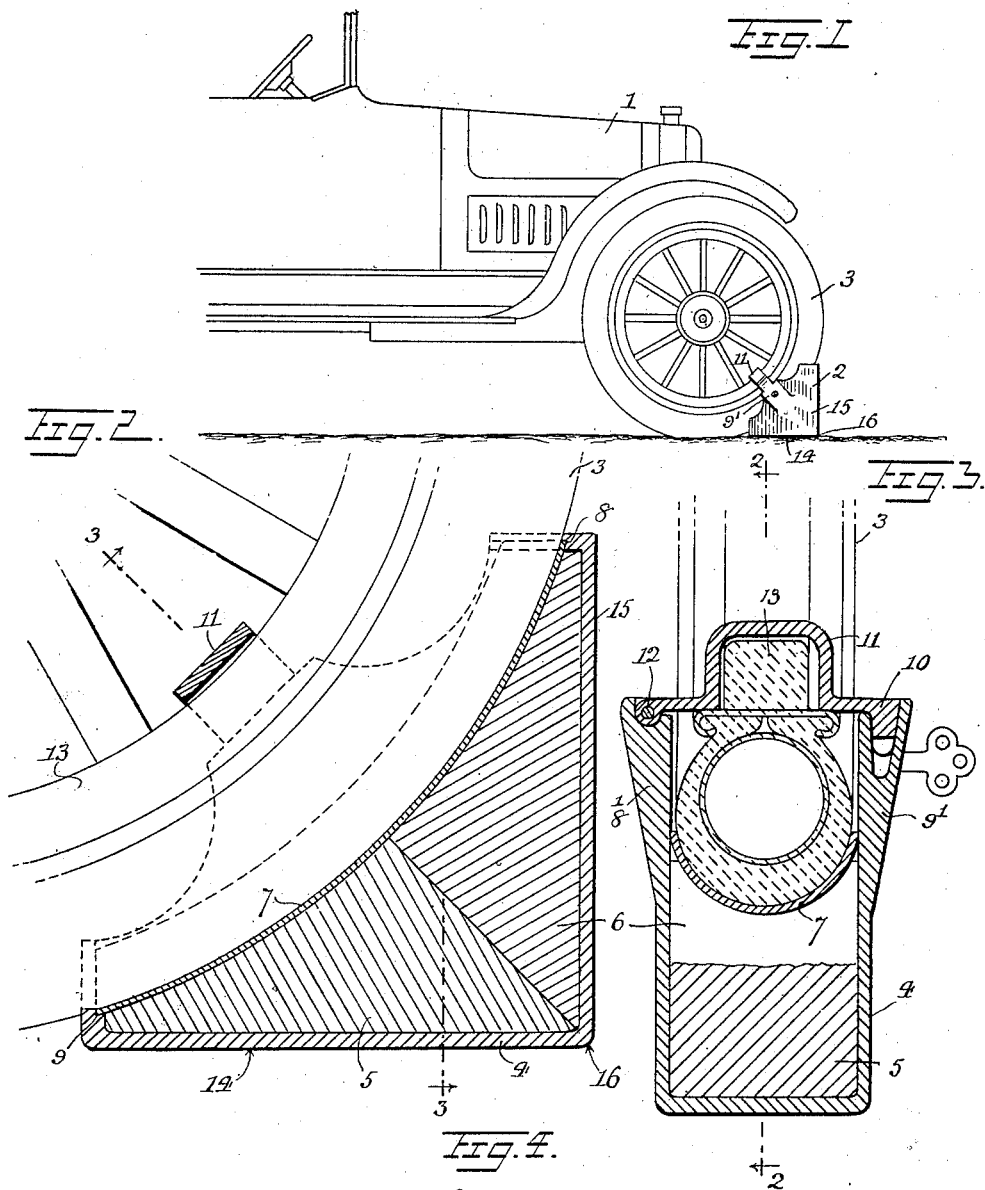
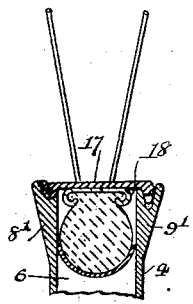
WITNESSES
H. T. Walker
A. L. Kitchin
INVENTOR
Leslie E. Trimm
BY
Munn & Co
ATTORNEYS

UNITED STATES PATENT OFFICE.

LESLIE E. TRIMM, OF BROOKLYN, NEW YORK.

AUTOMOBILE-WHEEL-LOCKING DEVICE.

1,379,423.  Specification of Letters Patent.  Patented May 24, 1921.

Application filed September 13, 1919. Serial No. 324,358.

*To all whom it may concern:*

Be it known that I, LESLIE E. TRIMM, a citizen of the United States, and a resident of the city of New York, borough of Brooklyn, in the county of Kings and State of New York, have invented a new and useful Automobile-Wheel-Locking Device, of which the following is a full, clear, and exact description.

This invention relates to locking members for automobiles and other vehicles, and has for an object to provide an improved construction in which a large device is utilized as means for either resisting or preventing the rotation of one or more wheels of an automobile.

Another object of the invention is to provide a lock for automobile wheels arranged with two flat sides and a clamping means for clamping the device in place so that one of the flat sides will act as a skid or runner in case it is attempted to move the automobile.

In the accompanying drawing:

Figure 1 is a fragmentary side view of the front of an automobile with a locking device embodying the invention shown applied thereto.

Fig. 2 is an enlarged longitudinal sectional view through a device embodying the invention, the same being shown applied and taken approximately on line 2—2 of Fig. 3.

Fig. 3 is a sectional view through Fig. 2, approximately on line 3—3.

Fig. 4 is a detail fragmentary sectional view showing the locking device with a modified form of clamping member to be used with metallic rims, the construction being shown on a reduced scale.

Referring to the accompanying drawing by numerals, 1 indicates an automobile of any desired kind to which the locking device 2 is connected, the same being clamped to one of the front wheels 3. It will, of course, be understood that the locking device 2 may be clamped or connected to any of the wheels of an automobile or to all four wheels if desired. The detail construction of the device 2 is shown in Figs. 2 and 3 from which it will be seen that a metal casing 4 is provided which may be sheet metal or may be cast, and is comparatively thin so as to provide a light strong construction. To reinforce the casing 4 two blocks of wood or other light filling members 5 and 6 are provided which snugly fit into the casing 1 and against which the metal arc-shaped plate 7 rests. The plate 7 is of the proper arc for receiving the tire of the wheel 3 and has its ends fitted into suitable notches 8 and 9 in the casing 4 where it is secured by screws or otherwise as desired. The casing 4 is provided with an upwardly extending thickened portion 8′ on one side and an upwardly extending thickened portion 9′ on the opposite side, said last mentioned thickened portion carrying a suitable lock co-acting with the keeper 10 preferably formed integral with the clamping member 11. This clamping member is hinged at 12 to the enlargement 8′ in any suitable manner, preferably in such a manner that the pintle of the hinge cannot be tampered with. In the form of the invention shown in Fig. 3 the clamping member 11 is formed to fit reasonably snugly the felly 13 of wheel 3 so that the parts will fit reasonably snugly against the wheel and will usually prevent any rotation of the wheel. In case there is a guard on the automobile, as shown in Fig. 1 of the drawing a rotation of the wheel would be impossible unless the guard was broken and removed. In any event a rotation of the wheel would tilt the automobile to one side and consequently the automobile could be moved only a few feet. In case the automobile was pushed by an outside source or by its own engine the usual action would be to slide the device 2 along on one of the surfaces 14 or 15. If the sliding action is continued any considerable time the corner 16 will dig into the ground and consequently will elevate the wheel and the automobile. From this it will be seen that the automobile can only be moved for a short distance at the best and at great inconvenience.

In Fig. 4 a clamping member 17 is provided which is substantially flat so as to fit against the metal rim or felly 18 commonly used with wheels having wire spokes. Aside from this slight variation to accommodate this form of felly the construction is identical with that shown in Figs. 2 and 3. Where the device is to be used on automobile wheels formed with a web center one or more holes must be provided in the web in order to accommodate the clamping member 11. When the device is in use and has been locked on a wheel it will prevent theft of the automobile because it cannot be removed and as it will prevent any appreciable movement of the automobile from a given point.

What I claim is:—

1. A chock block for automobiles comprising, a metal casing having a pair of right angular elongated faces, and vertical sides, a filler of wood in the casing and having an arc-shaped face, a metal arc-shaped plate secured to the casing in engagement with the arc-shaped face of the wooden filler, and means for securing the casing to the rim of a wheel.

2. A chock block for automobiles, comprising a metal casing having a pair of right angular faces, vertical sides having thickened upper portions, and an arc-shaped inner face to fit upon a tire of the wheel, a filling of wood in the casing, a lock in the thickened portion of one side, and a retaining member hinged to the other thickened side portion and provided with a keeper adapted to be engaged by the lock.

LESLIE E. TRIMM.